3,239,758
SYSTEM FOR MEASURING PEAK PULSE POWER USING SAMPLING AND COMPARISON TECHNIQUES
Paul A. Hudson, Warner L. Ecklund, and Arthur R. Ondrejka, Boulder, Colo., assignors to the United States of America as represented by the Secretary of Commerce
Filed Sept. 10, 1962, Ser. No. 223,002
3 Claims. (Cl. 324—98)

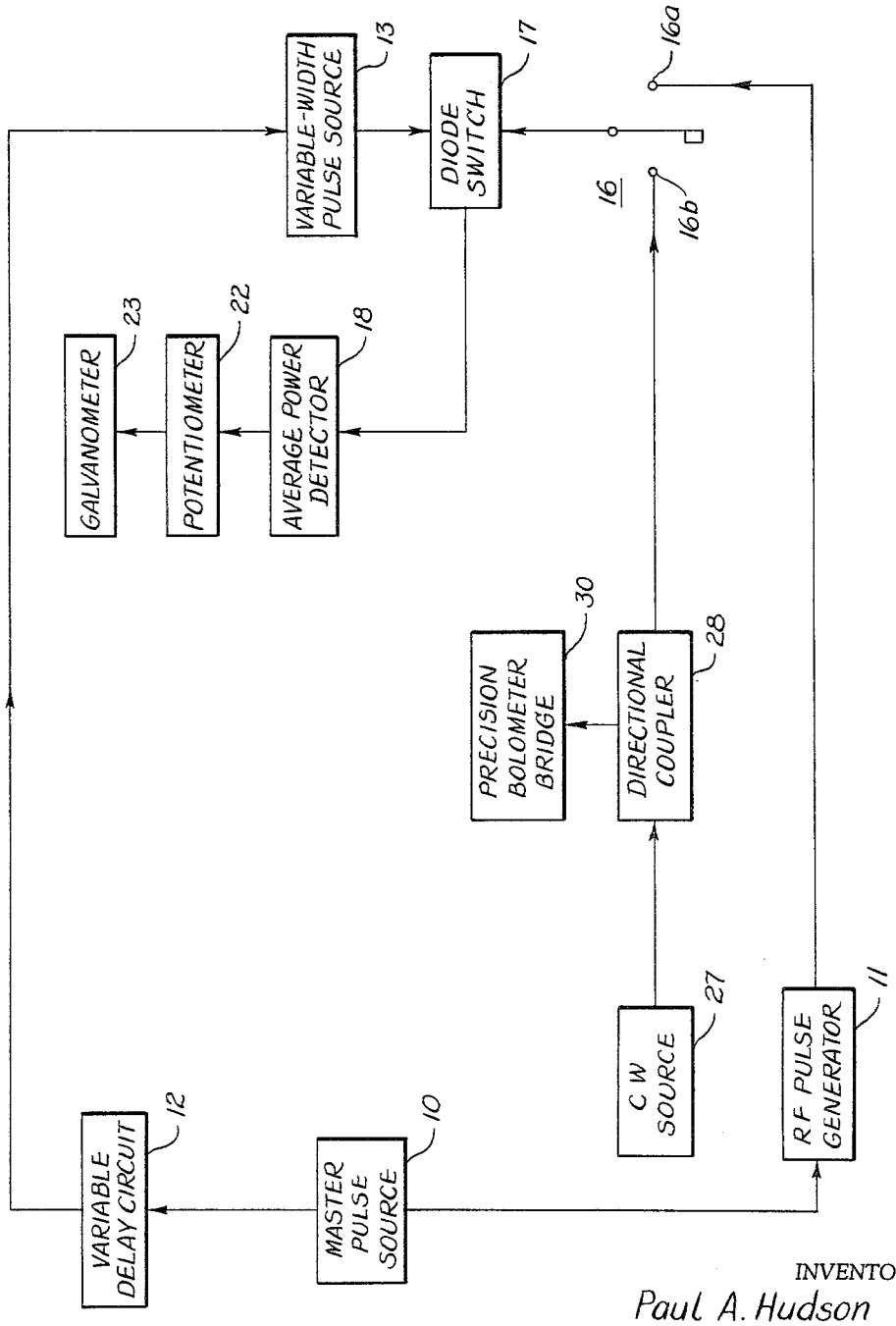

This invention relates to a system for measuring the peak power of a radio frequency pulse and in particular to one using sampling-comparison techniques.

At the present time, there are at least two types of radio frequency peak pulse power instruments commercially available. These are the notch wattmeter and a meter using a barretter integration-differentiation technique.

In the latter, the radio frequency pulse, whose peak power is to be measured, is integrated with a barretter. The integrated signal is amplified and then differentiated to obtain a pulse having a voltage amplitude that is a function of the peak power of the RF pulse. The peak power is then determined by measuring the peak amplitude of the differentiated pulse.

In the notch wattmeter, the signal of a standard generator is adjusted to a selected power level. This signal is notched (pulsed off) at the same rate as the RF pulse. The RF pulse is placed in the notch and adjusted, by means of a calibrated attenuator, to have the same voltage amplitude as the notch. The dial setting of the attenuator then indicates the peak power of the pulse in terms of db above or below the power level of the standard generator.

It is noted that in the instruments described above the determination of the peak power level of the RF pulse requires a voltage measurement or comparison.

Errors in measurements with these instruments are, according to manufacturer's specifications, of the order of 10 to 15%. When used to calibrate field instruments, the latter may be in error by 20 to 25% or more. Such large errors are not in keeping with space age requirements.

It is therefore an object of the present invention to provide improved accuracy in RF power measurements.

Another object is to provide an instrument in which the peak power of an RF pulse is compared directly with the power level of a standard continuous wave of substantially the same frequency.

A further object is to provide an instrument that may use only passive elements and thereby eliminate errors that occur when active elements are employed.

The figure represents an embodiment of the present invention.

In accordance with the present invention, the power level at the peak of a radio frequency pulse is compared with an accurately measured continuous wave power level at the same frequency. More specifically, the power in small portions of the RF pulse width is sampled until the one having the maximum level is ascertained. Subsequently, the same portion of the continuous wave is sampled and its power level made equal to that of a maximum-power portion of the pulse. The power level of the continuous wave is then accurately measured and equated, within the error limits of the system, to the peak power of the RF pulse.

The output of master pulse source 10 is applied to RF pulse generator 11, and is also applied through variable delay circuit 12 to variable-width pulse source 13, thereby synchronizing the outputs of generator 11 and source 13. The latter source provides pulses whose width may be selectively varied within desired limits, and variable-delay circuit 12 may be used to vary the time-position of these pulses relative to the leading edges of the pulses provided by generator 11.

The output of pulse generator 11 is fed through switch 16, when the arm of the switch engages contact 16a, to diode switch 17. The latter is a coaxial, S.P.DT., solid-state diode switch with a matched average power detector 18 connected to its normally-off output arm. The diodes in the switch are arranged so that each positive pulse from source 13 reverses the on-off condition on the output arm of the switch. The output of detector 18 is applied to potentiometer 22, whose output, in turn, is passed to galvanometer 23.

When the arm of switch 16 is in contact with terminal 16b, the output of C.W. source 27 is sent through directional coupler 28 to diode switch 17. The output of the directional coupler is also applied to precision bolometer bridge 30.

In operation, variable-width pulse source 13 is adjusted so that the pulses fed to average power detector 18, i.e., the sampling pulses, have a width that is no more than 10% of the width of the RF pulses provided by generator 11. And, in addition, by means of variable delay circuit 12, the sampling pulses are delayed selected variable amounts of time with respect to the leading edges of the RF pulses provided by generator 11. Thus, a sample of each RF pulse, with respect to its width, is switched to the average power detector 18; and the position of the sample is varied in time across the width of the pulse. By observing the D.C. output from the detector 18, as indicated on galvanometer 23, the sample is taken at that portion of the pulse where the RF power is a maximum. The D.C. output from the detector is then measured with potentiometer 22, and the measurement is recorded.

The arm of switch 16 is then positioned to engage contact 16b, and C.W. source 27 is set at substantially the same frequency as pulse generator 11. Holding all parameters of the pulses provided by source 13 fixed, the C.W. power level is varied until the output of the average power detector 18 is the same as that previously recorded. The C.W. power level into diode switch 17 is then measured by means of bolometer bridge 30. Within the error limits of the system, the C.W. power level may then be equated to the peak pulse power level.

Errors in the comparison, as described above, are due primarily to small imperfections in diode switch 17, pulse source 10 and 13, and pulse generator 11. These include pulse jitter, variations in repetition rate, the finite isolation between switch arms, and variations in switch insertion loss. The sum of the uncertainties total approximately 1%, which, when added to the 1% maximum error in C.W. power measurement, yields an overall error of approximately 2% for peak pulse power levels at the input of diode switch 17.

Obviously many modifications and variations of the present invention are possible in the light of the above teachings. The components of this system could, for example, be calibrated with C.W. power at various levels within its range and subsequently used to measure peak pulse power at the same frequency. In this case, it would not be necessary to compare with C.W. power for each measurement; and the equipment could be made semiportable. It is therefore to be understood, that within the scope of the appended claims, the invention could be practiced otherwise than as specifically described.

What is claimed is:

1. In a system for measuring the peak power of a series of pulses, means for sampling a portion of the width of each pulse in said series, first power measuring means, means for applying the sampled portion of each pulse to said first power measuring means, means for adjusting the time-position of the sampled portion of each pulse until said first power measuring means indicates maximum power, means for generating a continuous wave signal, means for applying selected portions of said continuous wave signal to said first power measuring means, means for adjusting the power of the selected portions of the continuous wave signal until the latter power is substantially equal to the power of the sampled portions of said pulses, second power measuring means, and means for applying said continuous wave signal to said second power measuring means.

2. The system set forth in claim 1 wherein each selected portion of the continuous wave signal and each sampled portion of a pulse have substantially the same time duration.

3. In a system for measuring the peak power of a series of pulses, means for sampling a portion of the width of each pulse in said series, first power measuring means, means for applying the sampled portion of each pulse to said first power measuring means, means for adjusting the time-position of the sampled portion of each pulse until said first power measuring means indicates maximum power, means for generating a continuous wave signal, means for disconnecting the sampled portion of each pulse from said first power measuring means, means for applying selected portions of said continuous wave signal to said first power measuring means, each selected portion of the continuous signal and each sampled portion of a pulse having substantially the same time duration, means for adjusting the power of the selected portions of the continuous wave signal until the latter power is substantially equal to the power of the sampled portions of said pulses, second power measuring means, and means for applying said continuous wave signal to said second power measuring means.

References Cited by the Examiner
UNITED STATES PATENTS

| 2,843,824 | 7/1958 | Whittier | 324—98 X |
| 2,989,700 | 6/1961 | Most | 324—103 |
| 3,120,630 | 2/1964 | Le Clear | 324—140 X |

WALTER L. CARLSON, *Primary Examiner.*

R. V. ROLINEC, *Examiner.*

C. F. DUFFIELD, *Assistant Examiner.*